J. W. CAMPBELL.
VARIABLE SPEED GEARING.
APPLICATION FILED APR. 7, 1914.
1,133,837.
Patented Mar. 30, 1915.
2 SHEETS—SHEET 1.
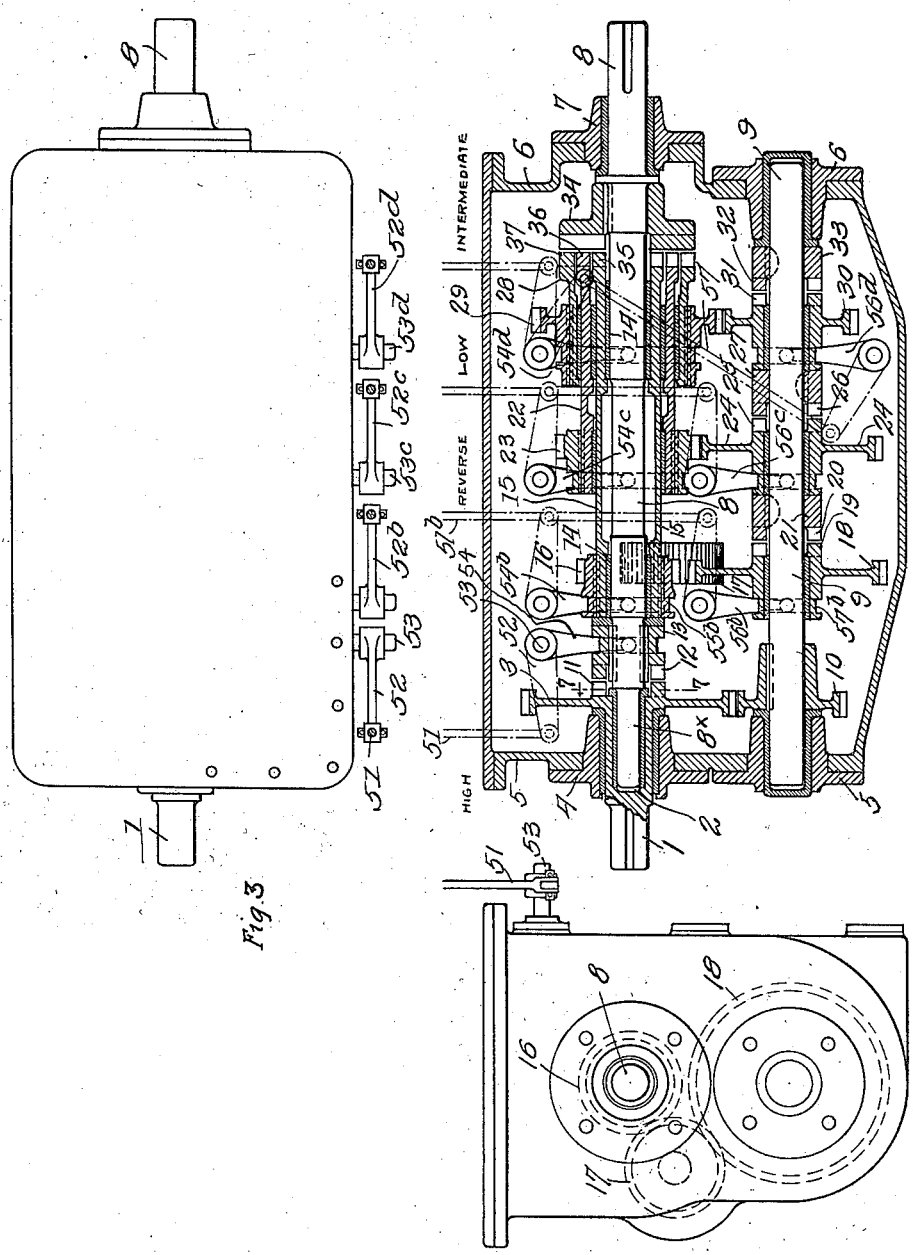
WITNESSES:
INVENTOR
James W. Campbell
BY Munn & Co.
ATTORNEY

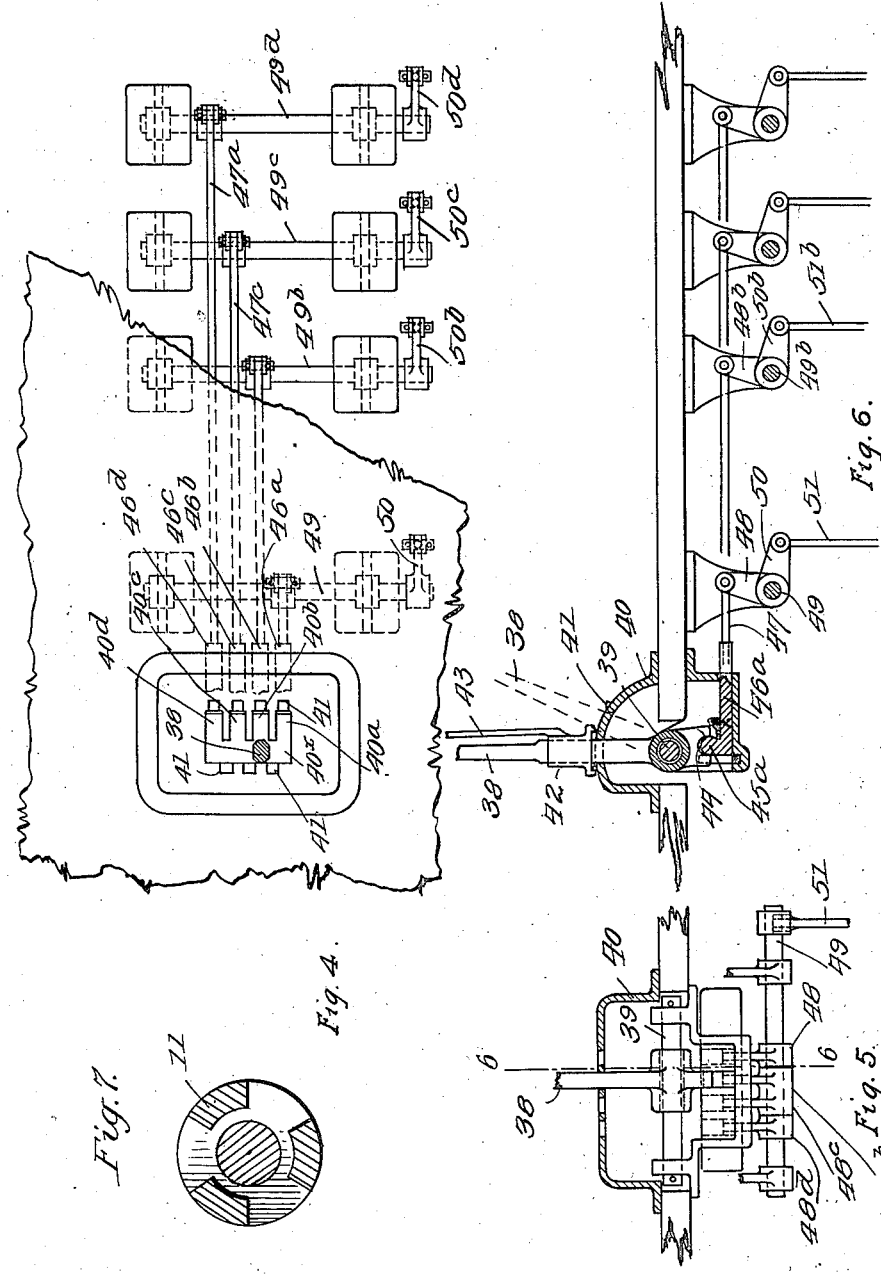

UNITED STATES PATENT OFFICE.

JAMES W. CAMPBELL, OF RENO, NEVADA.

VARIABLE-SPEED GEARING.

1,133,837.  Specification of Letters Patent.  Patented Mar. 30, 1915.

Application filed April 7, 1914. Serial No. 830,164.

*To all whom it may concern:*

Be it known that I, JAMES W. CAMPBELL, a citizen of the United States, and a resident of Reno, in the county of Washoe and State of Nevada, have made certain new and useful Improvements in Variable - Speed Gearing, of which the following is a specification.

My invention relates to improvements in variable speed gearing, and it consists in the combinations, constructions and arrangements herein described and claimed.

An object of my invention is to provide a transmission gearing by means of which various speeds may be imparted to the driven shaft, and in which the change from one speed to another is accomplished by means of clutch members without the necessity of shifting gears out of or into mesh with certain other gears.

A further object of my invention is to provide a variable speed mechanism in which a single lever is used for effecting the selection of any particular speed and for operating the clutches.

A further object of my invention is to provide a device of the type described in which the mechanism is shifted positively so as to give the desired speed and in which the device is locked after shifting so as to prevent another set of devices from in any way interfering with the set in use.

Other objects and advantages will appear in the following specification and the novel features of the device will be particularly pointed out in the appended claims.

My invention is illustrated in the accompanying drawings forming part of this application in which—

Figure 1 is a section through the device, Fig. 2 is an end view of the device, Fig. 3 is a plan view, Fig. 4 is a plan view of the ratchet plate for the operating lever, certain of the connecting levers being shown diagrammatically, Fig. 5 is a sectional view showing the connection of the operating lever with certain links, Fig. 6 is a sectional view on the line 6—6 of Fig. 5, and Fig. 7 is a section along the line 7—7 of Fig. 1.

In carrying out my invention I provide a drive shaft 1 having a central bore or recess 2 in its end. A gear 3 is secured to the end of the drive shaft. The shaft is mounted in a bearing member 4, provided with suitable linings for reducing the friction of the shaft. The bearing 4 is disposed in the end member 5 of the casing, an opposite end member 6 being provided with a similar bearing 7 for the clutch shaft 8. The latter extends from one end of the casing to the other, and its end $8^x$ is disposed in the bore 2 in the end of the shaft 1. The clutch shaft 8 is designed to rotate independently of the shaft 1, the motion of the shaft 1 being communicated to the shaft 8 by the mechanism hereinafter described.

Disposed parallel to the shafts 1 and 8 is an auxiliary shaft 9 whose ends are disposed in suitable bearings in the end members 5 and 6 respectively. The gear 3 is in mesh with a gear 10 whose hub is keyed to the shaft 9. The gear 3 is provided with a clutch member 11 like that shown in Fig. 7. This clutch member is arranged to engage a similar clutch member 12 carried by a collar 13 which is feathered to the shaft 8 in such a manner as to slide longitudinally of the shaft 1, but to revolve with it.

Slidably disposed on anti friction bearing sleeves 14 carried by the shaft 8 is a sleeve 15 upon which is secured a gear 16, arranged to mesh with an intermediate gear 17 (see Fig. 2) which in turn is operatively connected with a gear 18 slidably disposed on a shaft 9. The gear 18 is provided with a clutch member 19 similar to the clutch member 11 and arranged to engage a clutch member 20 on a collar 21 rigidly secured to the shaft 9.

Disposed externally of the sleeve 15 and slidable thereupon is a sleeve 22 which is provided with antifriction faces similar to those shown at 14. A gear 23 is secured to the sleeve 22 and is arranged to mesh with a gear 24 slidably carried by the shaft 9 and provided with a clutch member 25 arranged to engage a similar clutch member 26 on a collar 27 secured to the shaft 9.

A sleeve 28 is disposed externally of the sleeve 22 and is provided with a gear 29 arranged to mesh with a gear 30 slidably disposed on the shaft 9. The gear 30 is provided with a clutch member 31 arranged to engage a similar clutch member 32 carried by a collar 33 on the shaft 9.

Rigidly secured to the shaft 8 is a clutch member 34 which is arranged to be engaged by any of the clutch members 35, 36 or 37 carried at the adjacent ends of the sleeves 15, 22 and 28 respectively.

In order to provide for the operation of the transmission mechanism I arrange a common operating lever 38 which is loosely mounted on a stub-shaft 39, so as to slide longitudinally thereof, and also to have a pivotal movement thereon from the full line position shown in Fig. 6 to the dotted line position. In order to guide the shaft in its movement I provide a plate 40 of the shape shown in Figs. 4, 5 and 6. It will be observed that this plate has a slot $40^x$ which extends longitudinally of the shaft 39 with four laterally extending slots communicating therewith, these lateral slots being shown at $40^a$, $40^b$, $40^c$ and $40^d$ respectively. Locking lugs such as those shown at 41 are provided which are arranged to be engaged by a locking member 42 on the lever 38, said locking member 42 being operated by a rod 43. The lower end of the lever 38 is provided with a socket 44 arranged to engage semicylindrical extensions such as that shown at $45^a$ in Fig. 6, these extensions being integral with slidable rods such as that shown at $46^a$. As will be seen from Fig. 4 there are four of these rods $46^a$, $46^b$, $46^c$ and $46^d$. As shown in Fig. 4, these slidable rods are located opposite the slots $40^a$, $40^b$, $40^c$ and $40^d$ respectively. The rod $46^a$ is attached by means of a link 47 to an arm 48 on a shaft 49 bearing an arm 50. The latter is connected by a link 51 with an arm 52 on a shaft 53 having a yoke 54 operatively connected with the slidable block 13. The rod $46^b$ is connected by a link $47^b$ with an arm $48^b$ on a shaft $49^b$ having an arm $50^b$ to which a link $51^b$ is connected. The link $51^b$ is operatively connected with an upper yoke $54^b$ connected with a grooved integral collar $55^b$ on the gear 16, while the lower end of the rod $51^b$ is operatively connected with a yoke $56^b$ which is associated with a grooved collar $57^b$ of the gear 18. As will be clearly seen from the drawings the other rods $46^c$ and $46^d$ are operatively connected with similar upper yokes $54^c$ and $54^d$ associated with the gears 23 and 29 respectively and with lower yokes $56^c$ and $56^d$ respectively. As will be seen from Fig. 1 the upper yoke $54^d$ is connected with the lower yoke through the medium of arms or levers and the link 57.

From the foregoing description of the various parts of the device the operation thereof may be readily understood.

When the operating lever 38 is in the position shown in Fig. 6 the gearing is in the "neutral" position. This is the position shown in Fig. 1, for it will be observed that there is nothing to prevent the turning of the shaft 1, while the shaft 8 is idle. If intermediate speed is desired the lever 38 is shifted to the slot $40^d$, and then forced in the direction shown by dotted lines in Fig. 6. This will cause the rod $46^d$ to be pulled forwardly, thereby forcing both gears 29 and 30 together with their associate clutch members 37 and 31 respectively to the right in Fig. 1. The gears 29 and 30 will be constantly in mesh, but the engagement of the clutch member 37 with the clutch member 34 on the shaft 8, together with the engagement of the clutch member 31 with the clutch member 32 on the shaft 9, will cause the driving of the shaft 8 on intermediate speed, this driving being effected through the medium of gears 13, 10, shaft 9, clutch members 32, 31, gear 30, 29 and clutch members 37, 34 to gear 8. When high speed is desired the lever is moved to the slot $40^a$ and moved to the dotted line position, whereupon the clutch member 12 will be brought into mesh with the clutch member 11, thereby permitting the driving of the shaft 8 directly by the shaft 1. When low speed is desired the movement of the lever 38 in the slot $40^c$ will cause the shifting of the gears 23 and 24, together with their clutch members 36 and 25 respectively, the former engaging the clutch 34 and the latter the clutch member 26. Reverse speed may be obtained by similar manipulation of the lever in the slot $40^b$, the intermediate gear 17 serving to reverse the movement of the shaft 8 from the direction of rotation of the shaft 1.

It will thus be seen that I have provided a device in which the gears are constantly in mesh and in which the changing from one speed to another is accomplished by clutch members. The distinct advantage gained is that although these clutch members may wear, yet they will positively cause the actuation of the shaft even though considerably worn whereas the gears, on the contrary, would be put entirely out of commission before wearing down to any such extent. Furthermore the provision of a single lever for effecting the change of speed simplifies the operation of the mechanism which is a desideratum in this class of devices.

I claim:

1. In a variable speed mechanism, a drive shaft, an auxiliary shaft operatively connected therewith, a driven shaft normally disconnected from said drive shaft, a gear disposed on said driven shaft and slidable longitudinally thereof, a gear disposed on said auxiliary shaft and slidable longitudinally of said auxiliary shaft, said gears being constantly in mesh, a clutch member carried by said auxiliary shaft, a clutch member carried by said driven shaft, and clutch members associated with each of said gears and movable therewith for connecting said gears with the respective clutch members on their respective shafts.

2. In a variable speed mechanism, a drive shaft, a driven shaft normally disconnected therefrom, an auxiliary shaft operatively connected with said drive shaft, a gear slidably disposed on said driven shaft and having a clutch member, a gear slidably disposed on said auxiliary shaft and having a clutch member, said gears being constantly in mesh, means for moving said gears and clutch members simultaneously, a clutch member disposed on said auxiliary shaft, and a clutch member disposed on said driven shaft and arranged to be engaged by the first mentioned clutch members respectively.

3. In a variable speed mechanism, a driven shaft, a plurality of slidable gears disposed on said driven shaft, each of said gears having an associate clutch member, a common clutch member on said driven shaft arranged to be engaged by any of said first mentioned clutch members, and means for moving any one of said gears and its associate clutch member longitudinally of the driven shaft.

4. In a variable speed mechanism, a driven shaft, a plurality of slidable gears disposed on said driven shaft, each of said gears having an associate clutch member, a common clutch member on said driven shaft arranged to be engaged by any of said first mentioned clutch members, means for moving any one of said gears and its associate clutch member longitudinally of the driven shaft, an auxiliary shaft, a drive shaft operatively connected with said auxiliary shaft, and means carried by the auxiliary shaft for driving said driven shaft through the medium of one of said gears.

5. In a variable speed mechanism, a drive shaft, an auxiliary shaft operatively connected with said drive shaft, a driven shaft, a gear slidably mounted on said driven shaft, a clutch member carried by said gear, a gear slidably mounted on the auxiliary shaft, a clutch member carried by said last named gear, said gears being in mesh, a clutch member secured to said driven shaft and arranged to be engaged by the slidable clutch member on said driven shaft, a clutch member secured to said auxiliary shaft and arranged to be engaged by the slidable clutch member on said auxiliary shaft, and means for moving said slidable gears and their associate clutch members longitudinally of their respective shafts.

6. In a variable speed mechanism, a drive shaft, an auxiliary shaft operatively connected with said drive shaft, a driven shaft, a gear slidably mounted on said driven shaft, a clutch member carried by said gear, a gear slidably mounted on the auxiliary shaft, a clutch member carried by said last named gear, said gears being in mesh, a clutch member secured to said driven shaft and arranged to be engaged by the slidable clutch member on said driven shaft, a clutch member secured to said auxiliary shaft and arranged to be engaged by the slidable clutch member on said auxiliary shaft, means for moving said slidable gears and their associate clutch members longitudinally of their respective shafts, said last named means comprising bell-crank levers operatively connected with each of said gears, and a common lever for operating said bell-crank levers simultaneously.

JAMES W. CAMPBELL.

Witnesses:
S. R. TIPPETT,
FRANK D. KING.